Figure 1:
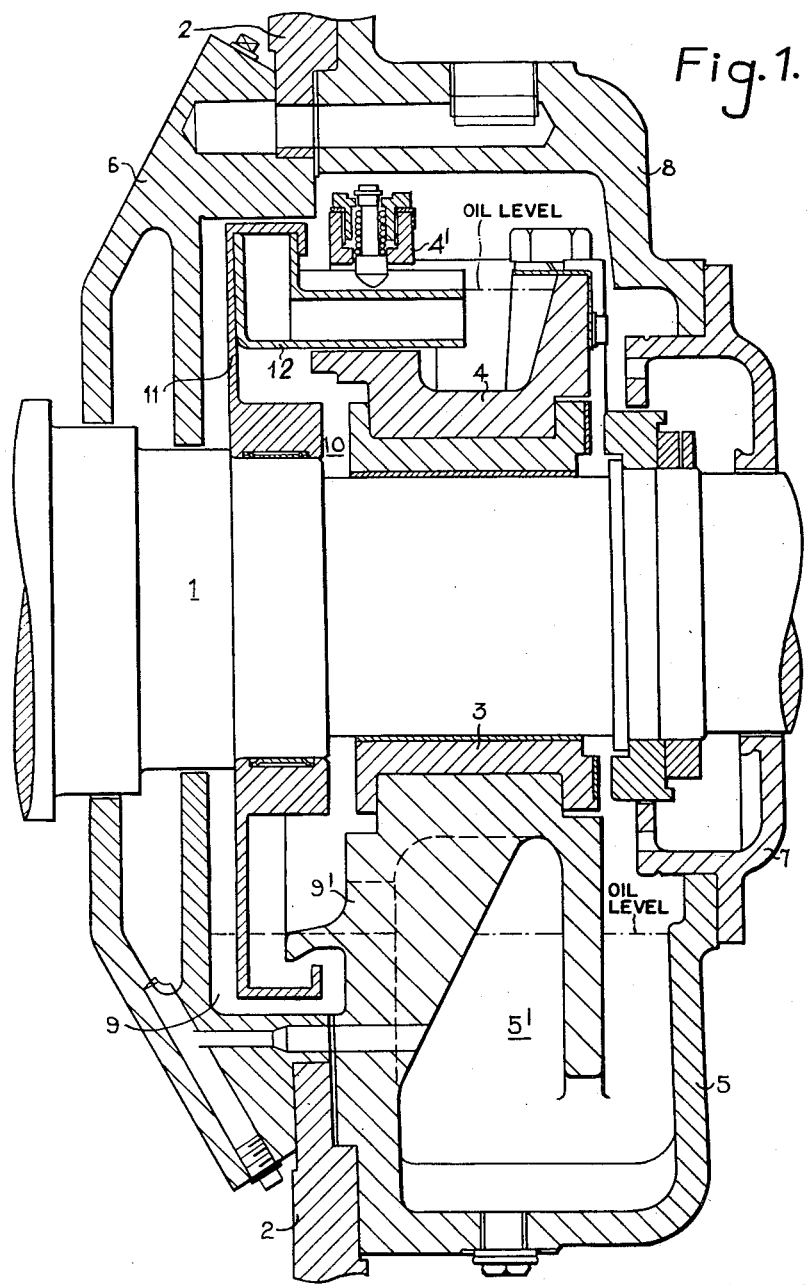

INVENTORS
GEORGE JONES
JOHN KENNETH VOSE
By: Norris & Bateman
attys

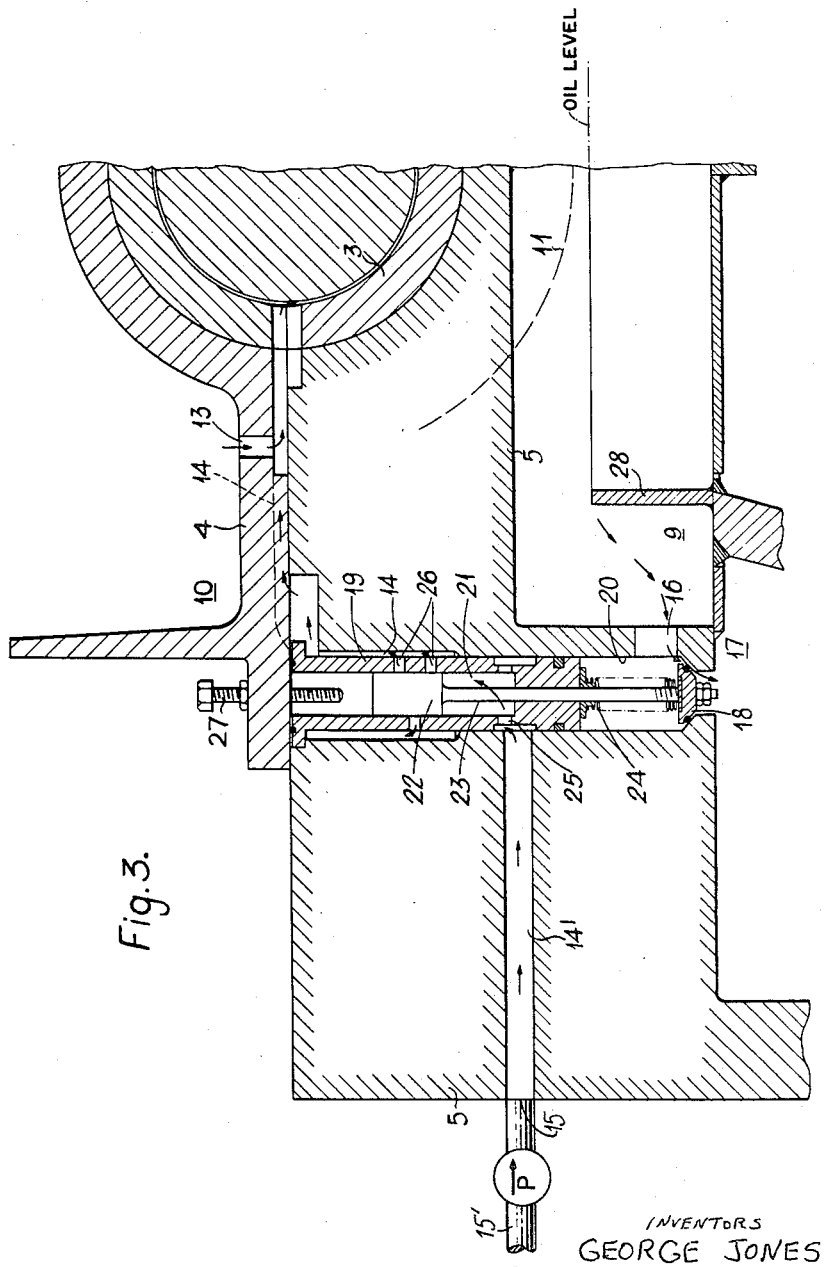

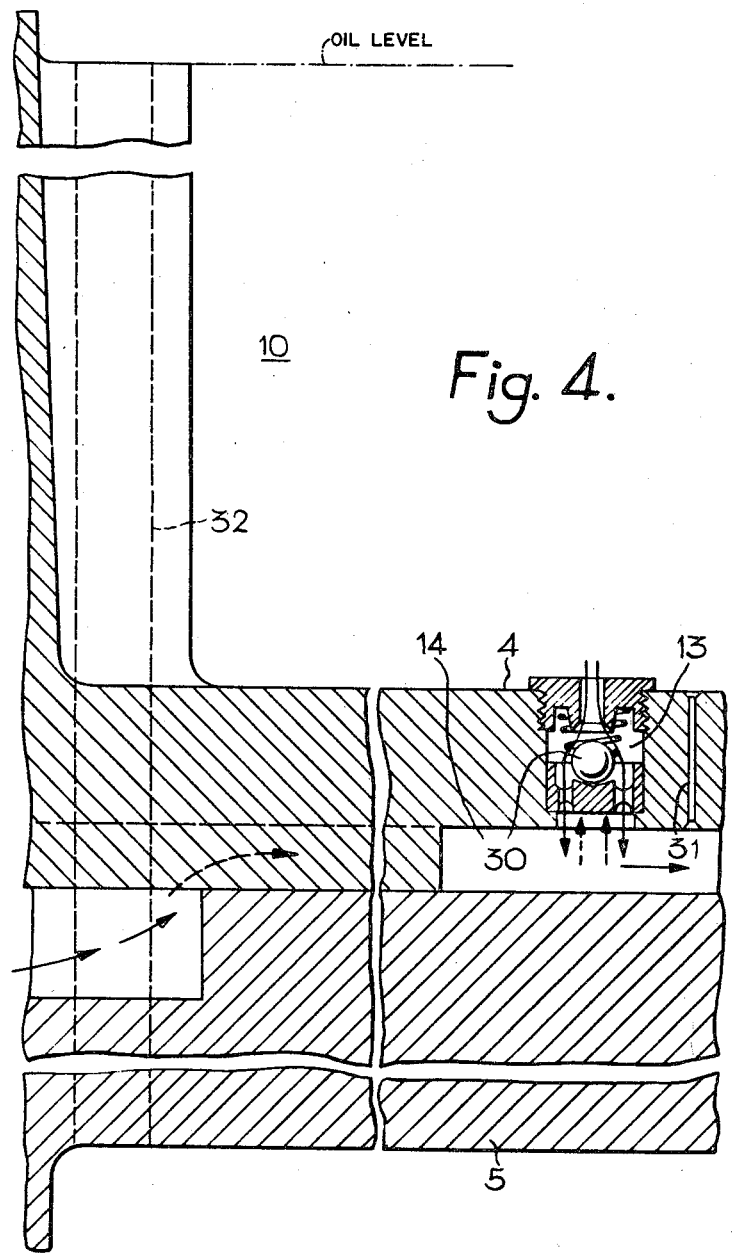

United States Patent Office 3,169,808
Patented Feb. 16, 1965

3,169,808
LUBRICATING SYSTEMS FOR PLAIN BEARINGS
George Jones, Eccles, and John Kenneth Vose, Sale, England, assignors to Associated Electrical Industries Limited, London, England, a British company
Filed Nov. 5, 1962, Ser. No. 235,257
Claims priority, application Great Britain, Dec. 15, 1961, 45,030/61
13 Claims. (Cl. 308—122)

This invention concerns lubricating systems for rotary machine bearings, particularly sleeve or journal bearings, as commonly used on dynamo-electric machines.

Two well known systems are the flow-lubricated type in which oil is injected to the bearing housing under pressure and through channels therein to the bearing surface of the machine, and the disc-lubricated type in which a disc rotating with the machine shaft picks up oil from a reservoir and pumps it through appropriate channels to the bearing surface whence it flows back to the reservoir.

An object of the invention is to provide a fail-safe lubricating system, and particularly one which operates normally by flow-lubrication but on failure of the flow system, for example due to the fluid pressure falling below a safe limit, maintains lubrication, temporarily at least, by a stand-by system, for example, a disc-lubrication system, until such time that the flow-lubrication is re-established.

In a particular known type of disc-lubricated bearing, herein referred to as "low loss disc-lubrication system" the oil is pumped by a disc from a lower reservoir in the bottom half of the bearing to an upper reservoir in the top half and flows by gravity through channels communicating with the working surface of the bearing. One of the advantages of this type, as compared with conventional constructions of disc and scraper, is the relatively low fluid friction loss owing to the fact that the bulk of the oil in the working circuit is, in normal operation, contained in the upper reservoir out of contact with the disc.

In combining flow-lubrication and "low loss disc-lubrication" so as to provide a fail-safe system, difficulties have hitherto been experienced in retaining the advantage of low fluid friction owing to the quantity of oil in circulation within the bearing housing. It is a further object of the present invention to overcome this disadvantage and provide such a system in which high fluid frictional losses and consequent high temperatures are avoided and in which the operation is efficient and precise.

According to the invention this object is achieved by providing in the lubricating system an automatic valve which, due to the pressure of oil injected for normal forced flow-lubrication, is arranged to control a stand-by lubrication system. Most advantageously the automatic valve will normally disable the stand-by system by causing oil to be withdrawn therefrom. Thus, in the case where the stand-by system is of the disc lubrication type, the valve will open a drain passage connected to a reservoir underneath the bearing and dump oil from the region of the disc, but in the event of the oil pressure falling below a safe limit will close the drain passage, thereby retaining in the reservoir any oil contained in the bearing housing at the time. The term dumping in this specification is intended to mean rapid clearance or drainage of oil.

In a preferred embodiment to be herein described the valve is operated to open by the pressure of the oil flow on a piston and is closed by a spring, the piston traversing one or more ports in the body of the valve to control the flow of oil to the bearing surface.

Figure 2:
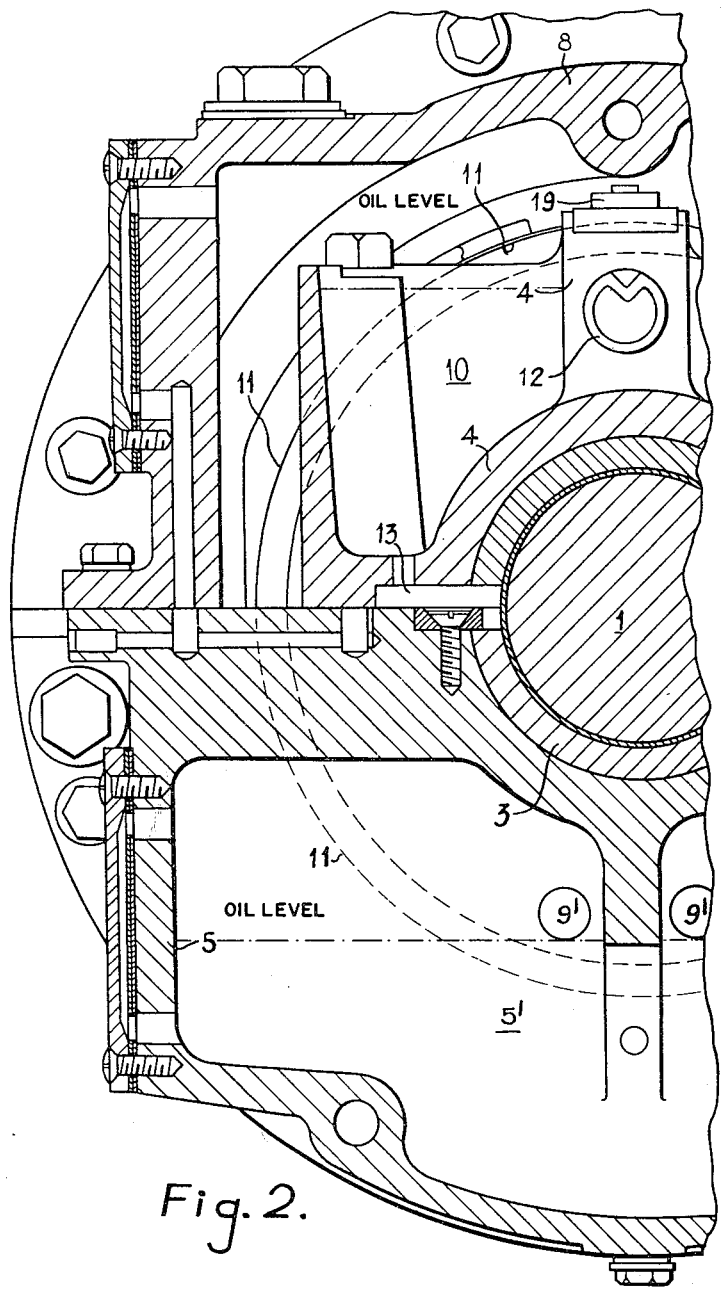

The invention will be described in more detail with reference to the accompanying drawings in which:

FIGS. 1 and 2 represent schematically a plain bearing assembly with low loss disc-lubrication, FIG. 1 being a longitudinal sectional elevation and FIG. 2 a transverse half-section; and FIG. 3 is a view similar to FIG. 2 showing a portion incorporating a dump a dump valve in accordance with the invention, the oil flow being indicated by the arrows; and FIG. 4 is an enlarged view of a modification of FIG. 3.

As seen in FIGS. 1 and 2 a motor shaft 1 is supported by a sleeve bearing mounted on a motor end bracket 2 through which the shaft projects. The bearing comprises a horizontally split bush 3, top and bottom half-housings 4, 5, and inner and outer bearing caps 6, 7. The upper part is enclosed by a top half-cover 8 mounted on end bracket 2. Bottom half-housing 5 and inner end cap 6 define a lower oil reservoir 9 which communicates with the interior 5' of half-housing 5 through ports 9'. The top of half-housing 4 is formed to provide an upper reservoir 10. FIGURES 1–4 indicate by dot-dash lines the levels of lubricant in the respective upper and lower reservoirs.

An oil pick-up disc 11 is fixed on shaft 1 in position to extend into reservoir 9 and raise oil therefrom into a scoop 12 whence it flows into reservoir 10. Scoop 12 is mounted in an upstanding lug 4' on housing 4. Oil flows from reservoir 10 through passageways 13 to the bearing surface and drains back into reservoir 9 and housing 5' for re-circulation. This construction represents a typical system of the aforesaid "low loss disc-lubrication" type.

Referring now to FIG. 3, in which corresponding parts are given like reference numbers to those in FIGS. 1 and 2, in addition to passageways 13 through which oil pumped up by the disc flows, channels 14', 14 are provided in the lower half-casing 5 for the flow of oil under pressure from an inlet represented by reference 15, thus providing a "flow-lubrication" system. As illustrated in FIGURE 3 oil under pressure is delivered into inlet 15 under pressure as by a pump P in a passage or conduit 15' leading from a suitable source (not shown). In order to prevent high fluid frictional losses and consequent high temperatures which would arise with disc 11 operating in the oil contained in reservoir 9 during normal fluid-flow-lubrication, a drain passage 16 communicating with the reservoir 9 is provided in the lower part of housing 5 through which excess oil can be dumped into a chamber 17. The flow from reservoir 9 is controlled by a dump valve 18 which operates in response to the pressure of oil flowing through channel 14.

The dump valve mechanism comprises a body 19 which is mounted in a cavity 20 in half-housing 5, and has a bore 21 with a piston 22 fixed to a spindle 23 which extends slidably through the end of the valve body and carries the valve head 18 at the other end. Head 18 is biased against a seating in drain passage 16 by a spring 24 to close the passage and prevents escape of oil from reservoir 9. Valve body 19 has an inlet port 25 connecting channel 14' with the inner end of bore 21 and one or more outlet ports 26 communicating with channel 14. Three outlet ports are shown spaced at different distances from the cylinder end for a purpose to be described. Body 19 is held in position by half-housing 4 bearing on its upper end and an adjustable screw stop 27 limits the travel of piston 22. It will be seen that, when the oil pressure in channel 14' and cylinder 21 is sufficient to overcome the bias of spring 24, piston 22 moves upwardly thereby lifting valve 18 and uncovering one or more of ports 26.

The degree of oil immersion of disc 11 when the dump valve is open for flow-lubrication will depend upon the distance of drain passage 16 above the bottom of reservoir 9. It may however be constructionally more convenient to provide a dam across the reservoir for this purpose as shown at 28 which will retain a predetermined quantity of oil. In the illustrated embodiment the disc does not, when valve 18 is open, dip into the oil.

In normal operation of the lubricating system according to FIG. 3, valve 18 is opened by the pressure of oil being forced to the bearing through channels 14', 14 and then serves to dump oil from the region of disc 11, thus preventing high fluid frictional losses and high temperatures. The system operates as a flow-lubrication system. If the oil pressure should fall for any reason, the valve closes trapping in the lower reservoir in which the disc operates the oil contained in the housing at the time. As, after a short period of operation, the upper reservoir will be full, it will be seen that in the event of a failure of the forced flow oil circulation system the bearing will continue to function as an ordinary disc-lubricated bearing. The period of safe operation will be limited only by the heating of the lubricant and bearing. Thus the invention provides a flow-lubricated bearing arrangement which will operate with a minimum of loss but which will, if the oil circulation fails, operate as a disc-lubricated arrangement having the advantages of that arrangement. Also, although we have described how the valve will close if the oil pressure falls owing to a failure, it will be realized that a similar sequence will be followed when the machine is stopped in the normal course of events, the oil pressure then gradually falling until the valve operates to close. Oil will then be trapped in the housing, and during the time the machine is stopped, will drain through the bearing into the bottom reservoir in which the disc operates. This oil will then be available whether in the top or bottom reservoir, for initiating lubrication when the machine is re-started.

In addition to the aforesaid operation the dump valve piston serves, when a number of ports 26 are provided as shown, to limit or control the flow of oil to the bearing. It will be seen that the piston 22 traverses a portion of the valve body wall containing a number of holes 26 which admit oil to the bearing through a passageway 14. By adjustment of the screwed stop 27 the travel of the piston can be limited and thus the number of holes uncovered by the piston, effectively controlling the flow of to the bearing. This feature is particularly advantageous when a number of bearings (for example those of a machine driven by the motor) are supplied with oil from one source. The flow of oil to the individual bearings can be controlled without prejudicing the disc-lubrication system during emergency or starting and stopping operation.

The pressure responsive valve 18 need not be piston-operated; it may in some circumstances be suitable to replace the piston by a diaphragm responsive to the oil pressure in the feed chanels 14. The valve mechanism would then not control the oil flow through the channel as is made possible by the piston 22 and ports 26.

A further feature of the invention concerns means for feeding oil to the upper reservoir. Some flow of oil into the top reservoir is necessary under normal conditions of forced flow, first to ensure that the reservoir is kept filled, and secondly, to give some cooling effect to the bearing from the relatively cool inlet oil. The rate of oil flow through the bearing clearance would not alone be sufficient for this purpose.

Since ports 13 must provide for gravity return of oil under disc lubrication conditions, it will be obvious that, under conditions of flow operation, and with ports 13 unrestricted against upward flow, oil will be forced under pressure from passage 14 through ports 13 into the top reservoir. The flow of oil under pressure into the top reservoir would then be too great. The drawings show one means of restricting the flow consisting in ball type non-return valves 30 in the ports 13. These allow free flow of oil under conditions of emergency disc lubrication but prevent the passage of oil under flow lubrication conditions. Control of the upward flow of oil under flow lubrication conditions can be obtained by drilling small diameter by-pass holes 31 in parallel with the non-return valves 30. If necessary, it would also be possible to control this by-pass oil in any conventional manner, e.g. by valves, or orifice plates.

Provision must also be made for continuously removing the oil entering the bearing housing. From one end of the bearing the leakage oil will pass to the main part of the lower housing and will be "dumped." Excess oil from the upper reservoir 10, will pass over a weir (not shown) and through a duct 32 (FIG. 4) into the main part of the lower housing and will also be "dumped" when the valve head 18 is raised. Leakage oil from the other end of the bearing, i.e. the end at which the disc 11 is mounted, will pass into the pumping chamber (not shown) and will be recirculated. No attempt has been made to deter the oil from this circuit as it is essential that some oil should be circulated by the disc.

What we claim is:

1. In a rotary machine incorporating a bearing having normal bearing clearance, means for lubricating said bearing comprising means defining upper and lower oil reservoirs disposed respectively above and below said bearing, said reservoirs communicating through said bearing clearance and passages associated therewith, a forced flow lubricating system comprising means for normally supplying oil under pressure to said bearing clearance, a stand-by lubricating system comprising means adapted for feeding oil from the lower reservoir to the upper reservoir for gravity feed through said bearing clearance back to the lower reservoir, and means responsive to the oil pressure in said forced flow system for maintaining said stand-by system substantially inoperable and automatically operable in the event of failure of said forced flow system to render said stand-by system operative to supply oil to the upper reservoir.

2. In a rotary bearing machine incorporating a bearing having normal bearing clearance, means for lubricating said bearing comprising means defining upper and lower oil reservoirs disposed respectively above and below said bearing, said reservoirs communicating through said bearing clearance and passages associated therewith, a forced flow lubricating system comprising means for normally supplying oil under pressure to said bearing clearance, a stand-by lubricating system comprising means for feeding oil from the lower reservoir to the upper reservoir for gravity feed through said bearing clearance back to the lower reservoir, a valve assembly controlling the supply of oil in said stand-by system, and control means for said valve assembly automatically operable to disable said stand-by system as long as a predetermined oil pressure is maintained in said forced flow system and automatically operable to render said stand-by system operable when said pressure fails.

3. A rotary machine with bearing lubricating means according to claim 2, wherein the stand-by system depends upon an available minimum oil level in said reservoir below the bearing and is disabled by draining of the oil from said lower reservoir due to the action of the valve assembly.

4. A rotary machine with bearing lubricating means according to claim 3, wherein said machine has a shaft journaled in said bearing and the stand-by system is of the type having a disc mounted on the machine shaft and dipping into said lower reservoir.

5. A rotary machine with bearing lubricating means according to claim 3, wherein said valve is located in a drain passage from said lower reservoir and is spring biased toward passage closing position.

6. A rotary machine with bearing lubricating means according to claim 2, wherein said valve assembly comprises a valve body having an inlet port communicating through the body with spaced outlet ports, said ports being open to the respective sides of said forced flow system, and a piston is slidably mounted in said body responsive to inlet oil pressure from said forced flow system to selectively uncover said outlet ports.

7. A rotary machine with bearing lubricating means according to claim 6, wherein the stroke of the piston, and thus the rate of oil supply, is controllable by means of an adjustable stop.

8. A rotary machine with bearing lubricating means according to claim 4, wherein said lower oil reservoir is provided with a dam to retain a minimum reserve quantity of oil in the reservoir under normal operating conditions of the forced flow system, such reserve oil representing no frictional loss when the forced flow system is in operation.

9. A rotary machine with bearing lubricating means according to claim 2, wherein the forced flow system includes ducts for oil delivery to the bearing, at least one of which ducts is common with the stand-by system, for delivering oil from said upper reservoir to the bearing when the forced flow system is not in operation.

10. A rotary machine with bearing lubricating means according to claim 2, wherein means are provided for allowing gravity feed of oil to the bearing from said upper oil reservoir via pressure oil ducts when the stand-by system is operating and means are provided for restricting oil flow under pressure in the opposite direction to the upper reservoir when the forced flow system is operating.

11. A rotary machine with bearing lubricating means according to claim 10, wherein non-return valves are provided for restricting the oil flow into the upper reservoir.

12. A rotary machine with bearing lubricating means according to claim 11, including oil by-pass orifices in parallel with said non-return valves.

13. A rotary machine with bearing lubricating means according to claim 10, including means for returning excess oil from the upper reservoir during the operation of the forced flow system to pumping chamber for recirculation.

References Cited in the file of this patent
UNITED STATES PATENTS 1,370,641   Grant ------------------ Mar. 8, 1921